Nov. 3, 1925.　　　　　　　　　　　　　　　1,560,336
J. F. DODD
INDICATOR
Filed July 3, 1924　　　　2 Sheets-Sheet 2
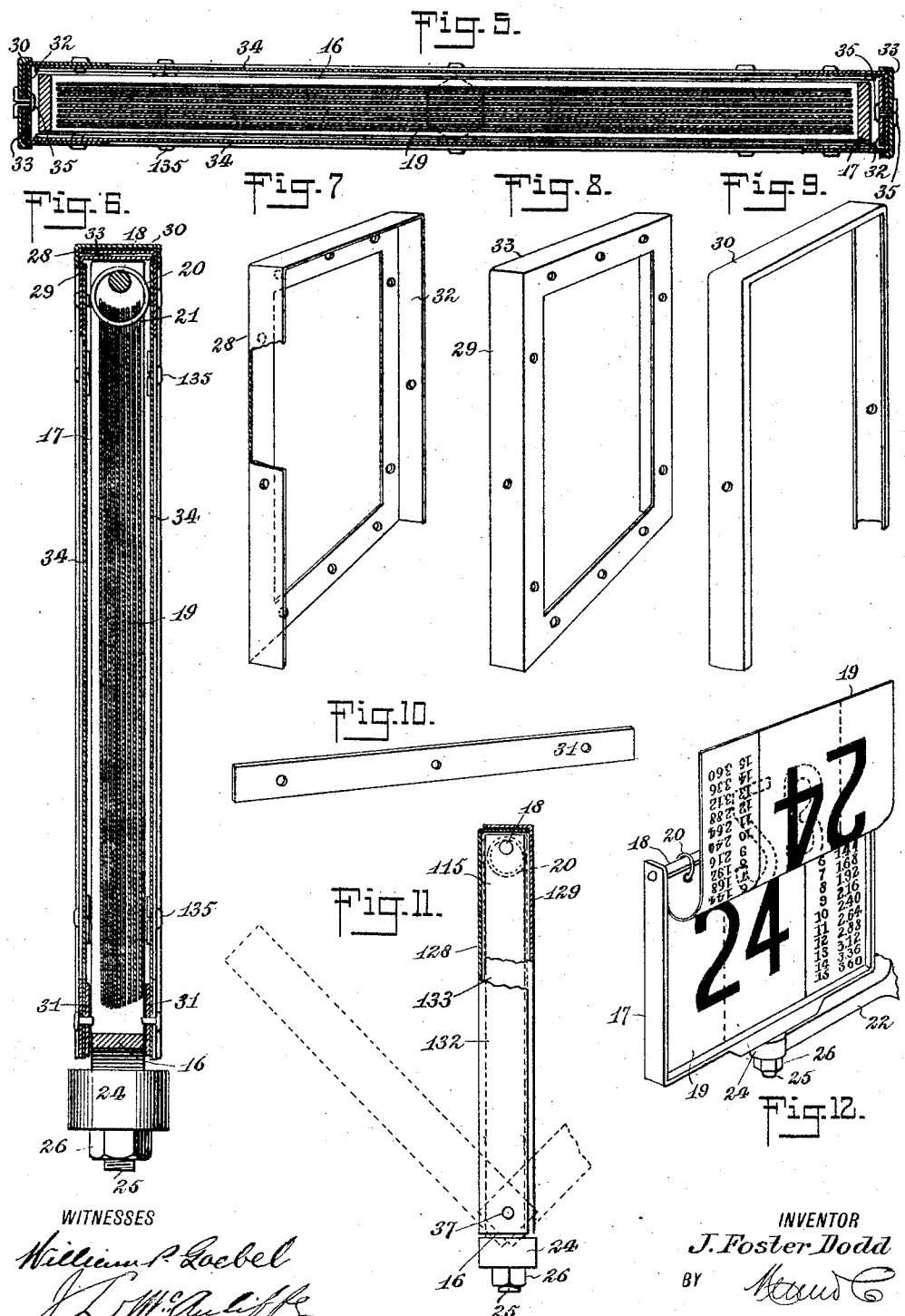
WITNESSES
INVENTOR
J. Foster Dodd
BY
ATTORNEYS Patented Nov. 3, 1925.

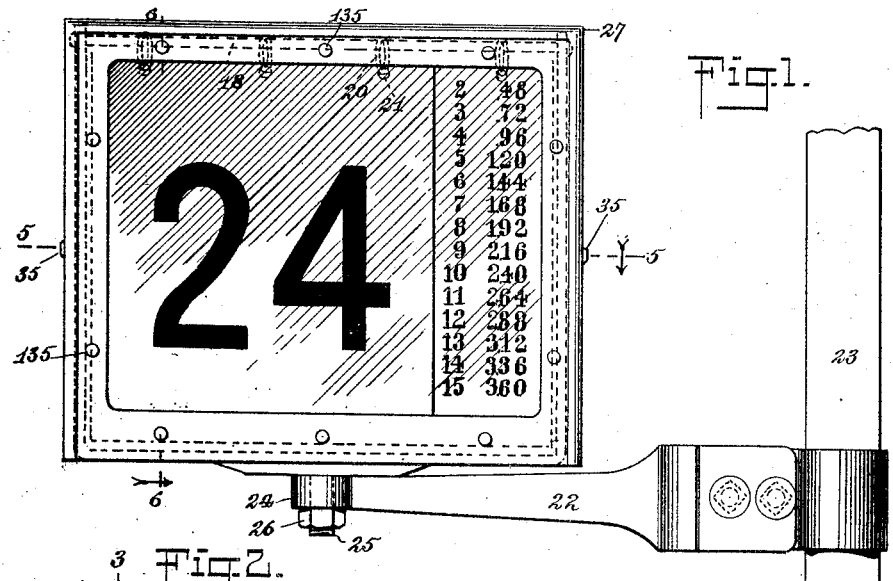
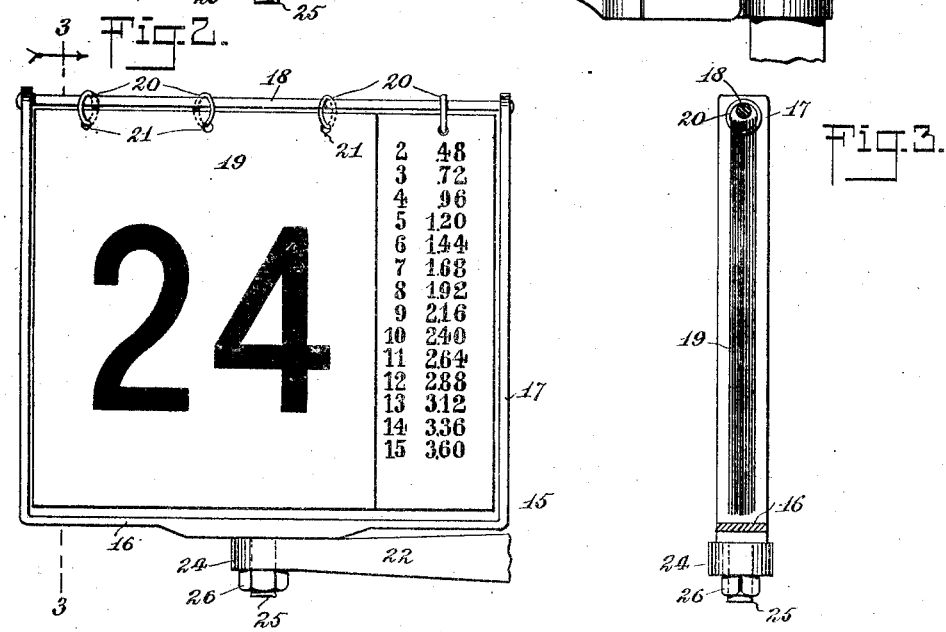
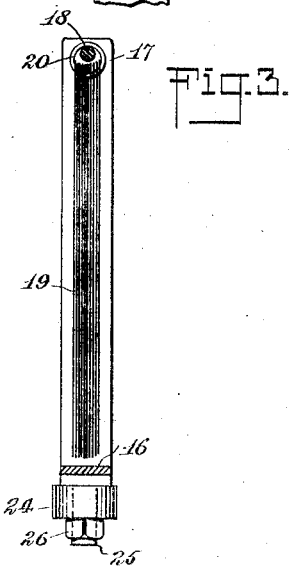
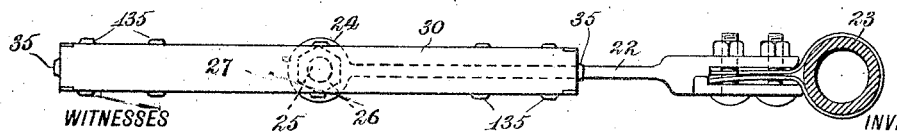

1,560,336

UNITED STATES PATENT OFFICE.

JAMES FOSTER DODD, OF DELAWARE, OHIO.

INDICATOR.

Application filed July 3, 1924. Serial No. 724,004.

*To all whom it may concern:*

Be it known that I, JAMES FOSTER DODD, a citizen of the United States of America, and a resident of Delaware, in the county of Delaware, and State of Ohio, have invented a new and Improved Indicator, of which the following is a description.

My invention relates to an indicating device which while useful for other purposes is particularly adapted for embodiment in an indicating means for use at gasoline stations for displaying the price of the gasoline and calculated amounts representing various quantities at given prices.

The present invention is intended as an improvement on the indicator for which Letters Patent No. 1473472 was granted to me November 6, 1923.

The general object of the present invention is to provide an indicator of the indicated type improved in various particulars with a view to obtain simplicity as well as convenience in changing the indicating means to show the cost of given quantities at different prices.

The nature of my invention and its distinguishing features and advantages will clearly appear as the description proceeds.

Reference is to be had to the accompanying drawings forming a part of this specification, it being understood that the drawings are merely illustrative of practical examples of the invention.

Figure 1 is a side elevation of an indicator embodying my invention;

Figure 2 is an elevation of the card holding frame the casing being removed;

Figure 3 is a transverse vertical section through the card holder as indicated by the line 3—3, Figure 2;

Figure 4 is a plan view of the indicator including the casing and supporting bracket;

Figure 5 is an enlarged horizontal section as indicated by the line 5—5, Figure 1;

Figure 6 is an enlarged transverse vertical section as indicated by the line 6—6, Figure 1;

Figures 7, 8, 9 and 10 are perspective views of different members forming the casing;

Figure 11 is a view partly in section and partly in end elevation illustrating a modification;

Figure 12 is a perspective view on a small scale of the card holder showing the arrangement of numbers on the respective faces of the cards to indicate a given price of gasoline on the two outermost cards visible at opposite sides of the indicator.

In carrying out my invention in the form shown in Figures 1 to 10 and Figure 12, a card holding frame designated generally by the numeral 15 is provided, presenting a bottom cross bar 16 and upright side members 17. Connecting the upper ends of the upright members 17 is a top bar 18 on which the cards 19 are hung by rings 20 passing through holes 21 in the cards and embracing said top bar 18. The frame 15 in practice is supported in any suitable manner as for example by a bracket 22 suitably clamped to a tubular standard 23 and formed with an eye 24 through which is passed a depending threaded stud 25 on the bottom bar 16 of the card holder, said stud having a nut 26.

A separable casing is provided for the holder 15, said casing being designated generally by the numeral 27, which is composed of two similar sides 28, 29 shown separately in Figures 7 and 8 and a flanged binding and reinforcing strip 30 as well as a pair of metallic weather strips 31. The sides 28, 29 have flanges 32, 33 at the top and sides which overlap or telescope as clearly shown in Figure 5, the flanges being omitted at the bottom to afford clearance for the entrance and removal of frame 15. The sides 28, 29 are open at the center for the major portion of their area and the openings are closed by transpicuous sheets 34 usually of transparent celluloid. The overlapped flanges 32, 33 are embraced by the flanged binding 30 which is of inverted U-shape and extending over the top and sides to make the casing weather-tight. For a similar purpose the strips 31 are secured to the front and back 28, 29 at the bottom thereof at the interior, see Figure 6. Fasteners 35 of known form having split bendable shanks are shown as employed in the illustrated example for securing the binding strip 30 to the flanges 32, 33.

Reverting to the cards 19 and making special reference to Figure 12, the number such as "24" representing for example the price of gasoline per gallon is in a large panel on a face of the card, said panel being separated by a vertical line from a narrower panel bearing a vertical row of numbers from 2 to 15, for instance, as shown representing different quantities expressed in gallons and the calculated price of the different quantities at the price displayed in the larger panel. The order of the larger and smaller panels is reversed on the opposite sides of the card and a given number on a face of one card is repeated on the opposite face of the next card. The arrangement is such that when a given card 19 is swung on the bar 18 from one side to the other of the indicator, the same number will be displayed on both sides of the indicator. Thus, a card bearing the number "24" on one face will bear the next higher number on its opposite face, and the same numbers, that is to say, corresponding numbers, are displayed on one face of each card. The described arrangement of the cards will be clear from an inspection of Figures 1, 2 and 12.

In order to change the price displayed in the large panel and to display corresponding columns of quantities and calculated price for given quantities, it is necessary only to swing the card over the bar 18 from one side of the indicator to the other.

In the form of the invention shown in Figure 11 the card holder 115 corresponds in all respects with the card holder 15 except that the casing is in the form of sections pivoted to said holder. Thus, said casing constitutes sides 128, 129 having flanges 132 and 133 that overlap in the closed position of the casing sections. Pivots 37 secure the side flanges 132, 133 to the vertical bars of the holder 115 permitting said sections 128, 129 to be swung outwardly to the dotted line positions to thus afford access to the cards in the holder 115 for permitting them to swing over the bar 18. The numeral 20 indicates the rings 20 employed in the construction shown in Figure 11 as in the first construction. Fasteners 135 secure the sheets 34 to the casing sections.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. An indicator of the class described comprising a card holder having means at the bottom to secure the same to a support and having a top cross bar, a plurality of indicating cards, means swingably suspending said cards from the top cross bar, and a casing formed of side sections, said casing being in separable relation to the card holder and having side members and top members to exclude rain from the card holder, the said casing having transpicuous sides and said cards bearing indicia on faces thereof and so disposed that when a card is swung from one side of the holder over the top cross bar to the other side of the holder the same indicia will appear at both transpicuous sides of the casing.

2. An indicator of the class described comprising a card holder having a cross bar, a plurality of indicating cards suspended on said cross bar and swingable thereon from a position at one side of the card holder to a position at the opposite side of the card holder, said cards bearing indicia, and a casing formed of side sections, said casing being in separable relation to the card holder and having transpicuous sides, and the indicia on a face of one card being duplicated on the face of an adjacent card so that the same indicia will appear on the cards at opposite sides of the casing.

3. An indicator of the class described comprising a card holder, cards suspended on said card holder and swingable thereon from a position at one side of the holder to a position at the opposite side, said cards bearing indicia so positioned that the same indicia appears at both sides, and a casing having an open bottom and closed sides and top, said casing being in separable relation to the card holder.

4. An indicator of the class described comprising a card holder, cards suspended on said card holder and swingable thereon from a position at one side of the holder to a position at the opposite side, said cards bearing indicia so positioned that the same indicia appears at both sides of the holder, said casing having a sliding relation to the card holder to be lifted therefrom for exposing the card holder or to be dropped onto the card holder for housing the holder.

JAMES FOSTER DODD.